(12) United States Patent
Armstrong et al.

(10) Patent No.: US 9,823,887 B2
(45) Date of Patent: Nov. 21, 2017

(54) METHODS AND SYSTEMS FOR MANAGING A PRINT PREVIEW

(71) Applicant: CANON KABUSHIKI KAISHA, Tokyo (JP)

(72) Inventors: Charles Thomas Armstrong, Rancho Santa Margarita, CA (US); Loren A. Wood, Lakewood, CA (US)

(73) Assignee: CANON KABUSHIKI KAISHA, Tokyo (JP)

( * ) Notice: Subject to any disclaimer, the term of this patent is extended or adjusted under 35 U.S.C. 154(b) by 419 days.

(21) Appl. No.: 14/256,435

(22) Filed: Apr. 18, 2014

(65) Prior Publication Data

US 2015/0301776 A1     Oct. 22, 2015

(51) Int. Cl.
*G06F 17/00* (2006.01)
*G06F 3/12* (2006.01)

(52) U.S. Cl.
CPC .......... *G06F 3/1277* (2013.01); *G06F 3/1204* (2013.01); *G06F 3/1208* (2013.01); *G06F 3/1211* (2013.01); *G06F 3/1256* (2013.01); *G06F 3/1285* (2013.01)

(58) Field of Classification Search
CPC .... G06F 3/1277; G06F 3/1204; G06F 3/1208; G06F 3/1285; G06F 3/1211; G06F 3/1256

USPC ............................... 715/274; 358/1.15, 1.18
See application file for complete search history.

(56) References Cited

U.S. PATENT DOCUMENTS

| | | | | |
|---|---|---|---|---|
| 2003/0103221 | A1* | 6/2003 | Natori .................. | G06F 3/1205 358/1.9 |
| 2005/0094191 | A1* | 5/2005 | Vondran, Jr. .......... | G06F 3/1212 358/1.15 |
| 2009/0290185 | A1* | 11/2009 | Shiohara ............... | G06F 3/1208 358/1.13 |
| 2011/0075200 | A1* | 3/2011 | Goldwater ............ | G06F 3/1205 358/1.15 |

* cited by examiner

*Primary Examiner* — Scott Baderman
*Assistant Examiner* — Jason Edwards
(74) *Attorney, Agent, or Firm* — Canon U.S.A., Inc. IP Division

(57) ABSTRACT

Devices, systems, and methods for managing a print preview receives a first preview request; configures a filter pipeline; obtains a job flow; generates a first parts list based at least on the first preview request and the job flow; determines whether the filter pipeline is clear of parts; processes one or more parts listed in the first parts list using the filter pipeline; receives a second preview request; determines whether the one or more parts listed in the first parts list of the first preview request can be used in the second preview request; generates a second parts list based on the second preview request; determines whether the filter pipeline is clear of the one or more parts listed in the first parts list; and processes one or more parts listed in the second parts list using the filter pipeline.

20 Claims, 9 Drawing Sheets

METHODS AND SYSTEMS FOR MANAGING A PRINT PREVIEW

BACKGROUND

Field of the Disclosure

The present disclosure relates generally to methods and systems for managing print previews.

Description of the Related Art

An operating system which provides a print architecture that includes filter pipelines to process print jobs has been introduced. The filter pipelines can be used to realize a print-preview function that allows a user to preview images of a document before submitting a print job. When the print-preview function is invoked, the current filter-pipeline framework is designed to setup the filter pipeline, initialize the filters, unpack the XPS document, and send the parts of the XPS document to the filter pipeline. Additionally, each time the print-preview function is invoked, the filter pipeline restarts the entire process after the entire document of the previous process is processed or after the filter pipeline is commanded to shut down the previous process. For example, when a user requests a preview of a first range of pages (e.g., pages 1-10) of a document with 100 pages, the filter-pipeline manager starts processing the first range of pages for the first preview. While the first range of pages is being processed, the user requests a preview of a second range of pages (e.g., pages 50-60) of the document. Before the filter-pipeline manager starts processing the second range of pages for the second preview, the filter-pipeline manager processes the entire document for the first preview or processes the first range of pages for the first preview until a command to shut down the filter pipeline is received. After the processing of the entire document for the first preview is completed or the command to shut down the filter pipeline is received, the filter-pipeline manager starts the same process again for the second preview, including setting up the filter pipeline, initializing the filters, unpacking the XPS document, and sending the parts for the second range of pages. Thus, it is time consuming and inconvenient for the user.

SUMMARY

In one embodiment, a method for managing a print preview comprises receiving a first preview request, wherein the first preview request includes an XPS file; configuring a filter pipeline based on the XPS file; obtaining a job flow from the XPS file; generating a first parts list based at least on the first preview request and the job flow; determining whether the filter pipeline is clear of parts; in response to determining that the filter pipeline is clear of the parts, processing one or more parts listed in the first parts list using the filter pipeline; receiving a second preview request; determining whether the one or more parts listed in the first parts list of the first preview request can be used in the second preview request; generating a second parts list based on the second preview request, wherein the one or more parts listed in the first parts list are included in the second parts list if the one or more parts listed in the first parts list can be used in the second preview request; determining whether the filter pipeline is clear of the one or more parts listed in the first parts list; and in response to determining that the filter pipeline is clear of the one or more parts listed in the first parts list, processing one or more parts listed in the second parts list using the filter pipeline.

In one embodiment, a computing device comprises one or more computer-readable media and one or more processors coupled to the computer-readable media and configured to cause the computing device to perform operations including receiving a first preview request and a second preview request from a preview application, wherein the first preview request includes an XPS file; loading one or more filters in a filter pipeline based on the XPS file; generating a job flow based on the XPS file; generating a first parts list based on the first preview request and the job flow and a second parts list based on the second preview request and the job flow, wherein the first parts list and the second parts list include one or more parts specified in the first preview request and the second preview request, respectively; determining whether one or more parts listed in the first parts list of the first preview request can be used in generating the second parts list of the second preview request, wherein the one or more parts listed in the first parts list of the first preview request are re-used in the second parts list of the second preview request in response to the determination that the one or more parts listed in the first parts list of the first preview request can be used in generating the second parts list of the second preview request; determining whether the filter pipeline is clear of the one or more parts and reset a filter pipeline if the filter pipeline is determined to be not clear of the one or more parts; processing the one or more parts included in the first preview request and the second preview request; and sending the processed one or more parts of the first preview request and the second preview request to the preview application.

In one embodiment, one or more computer-readable media store instructions that, when executed by one or more computing devices, cause the computer devices to perform operations comprises receiving a first preview request, wherein the first preview request includes an XPS file; configuring a filter pipeline based on the XPS file; obtaining a job flow from the XPS file; generating a first parts list based at least on the first preview request and the job flow; determining whether the filter pipeline is clear of parts; in response to determining that the filter pipeline is clear of the parts, processing one or more parts listed in the first parts list using the filter pipeline; receiving a second preview request; determining whether the one or more parts listed in the first parts list of the first preview request can be used in the second preview request; generating a second parts list based on the second preview request, wherein the one or more parts listed in the first parts list are included in the second parts list if the one or more parts listed in the first parts list can be used in the second preview request; determining whether the filter pipeline is clear of the one or more parts listed in the first parts list; and in response to determining that the filter pipeline is clear of the one or more parts listed in the first parts list, processing one or more parts listed in the second parts list using the filter pipeline.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the systems and methods described herein.

Figure 1A:
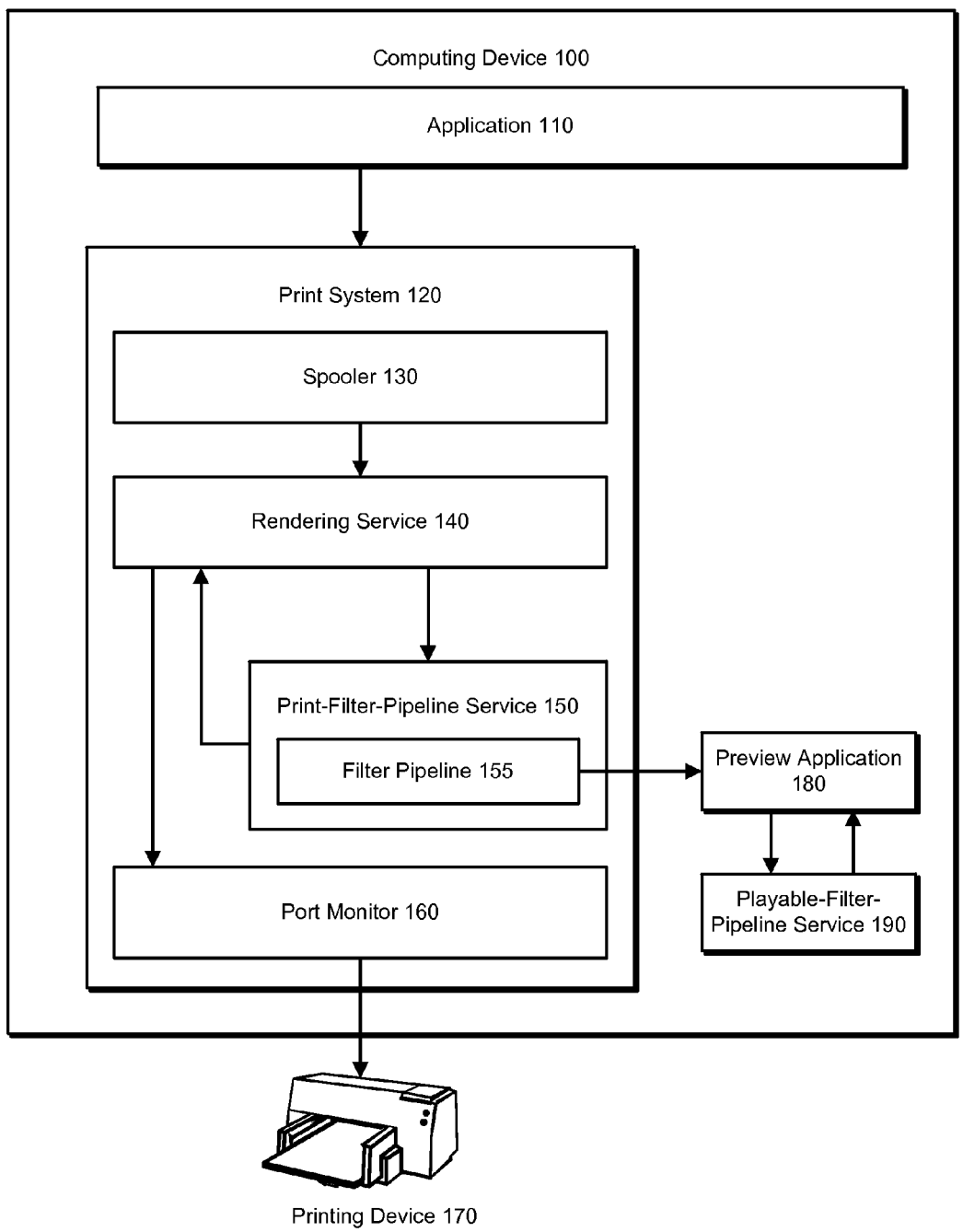
FIG. 1A is a block diagram that illustrates an example embodiment of a system for managing a print preview.

FIG. 1A is a block diagram that illustrates an example embodiment of a system for managing a print preview. The system for managing a print preview includes a computing device 100 and a printing device 170.

The computing device 100 may be any computing device, such as a desktop, laptop computer, server, a mobile phone, a personal digital assistant (PDA), or a tablet. The computing device 100 is capable of communicating via a network and may include or communicate with at least one display that is capable of rendering images. The computing device 100 includes one or more processors (also referred to herein as "CPUs"), which may be a conventional or customized microprocessor(s). The CPUs are configured to read and execute computer-readable instructions, and the CPUs may command or control other components of the computing device 100.

The computing device 100 also includes I/O interfaces, I/O devices, or both. The I/O interfaces provide communication interfaces to I/O devices, and the I/O devices may include a keyboard, a display device, a mouse, a touch screen, a light pen, an optical storage device, a microphone, a camera, a scanner, a printer, etc. The computing device 100 also includes memory, which may be volatile (e.g., RAM), non-volatile (e.g., ROM, flash memory), or a combination of both. The computing device 100 further includes a network interface that allows the computing device 100 to communicate with other devices. The computing device 100 also includes a storage device that includes one or more computer-readable or computer-writable storage media. A computer-readable storage medium, as opposed to mere transitory, propagating signals, is a tangible article of manufacture, for example, a magnetic disk (e.g., a hard drive, a floppy disk), an optical disc (e.g., a CD, a DVD, a Blu-ray), a magneto-optical disk, magnetic tape, and semi-conductor memory (e.g., a non-volatile memory card, flash memory, a solid-state drive, SRAM, DRAM, EPROM, EEPROM). The computing device 100 includes an operating system, which manages the hardware, the processes, the interrupts, the memory, or the file system of the computing device 100. The computing device 100 further includes an application 110, a print system 120, a preview application 180, and a playable filter pipeline service 190.

The application 110 may be any application that sends prints data, such as a word-processing application, a photo-editing application, and a web browser, to a print system.

The application 110 is configured to generate a user interface that presents information to the user, to receive information from the user via the computing device 100 (e.g., via the I/O interfaces of the computing device 100), or to do both. The user interface may present information in the form of a graphical interface that shows settings and capabilities of a printing device (e.g., the printing device 170) and that receives user selections, such as selections of one or more options for a respective print setting. In addition to selecting one or more options for a respective print setting, the user may select to print or to preview the print job. The information may also be presented in any other manner (i.e., via a graphical interface with soft keys, hard keys, or both) that allows the user to view the information, to select one or more options, or to do both. The application 110 is further configured to generate a print job according to the selected print-setting options. In addition, the generated print job may be organized in the form of markup-language data, for example a PrintTicket document. The PrintTicket document may be extensible markup language (XML) data that describes the selected options for the print job.

The print system 120 is configured to receive a print job from an application (e.g., the application 110), render the print job, and send the rendered print job to the printing device 170. In some embodiments, the print system 120 sends the print job to the preview application 180 for a print preview of the print job. The components of the print system 120 include a spooler 130, rendering service 140, a print-filter-pipeline service 150, and a port monitor 160.

The spooler 130 is configured to receive the print job from the application 110 via the print system 120, store the print job, and, when the rendering service 140 is ready to process the print job, send the stored print job to the rendering service 140. The rendering service 140 is configured to receive the print job from the spooler 130, convert the print job to an XML Paper Specification (XPS) file and a configuration file based on the print job, and send the XPS file and the configuration file to the print-filter-pipeline service 150.

The print-filter-pipeline service 150 is configured to receive the XPS file and the configuration file from the rendering service 140 and process the XPS file. The components of the print-filter-pipeline service 150 include at least a filter pipeline 155, which includes one or more filters, and each filter is assigned a single operation of a specific task. The print-filter-pipeline service 150 may configure the filter pipeline 155 according to the configuration file. In addition, the print-filter-pipeline service 150 feeds the document parts and the PrintTickets of the XPS file to the filters in the filter pipeline 155. After each filter processing is complete, the output from the last filter in the filter pipeline 155 is sent to the rendering service 140. Then, the rendering service 140 sends the output, which is in the format supported by the printing device 170, to the printing device 170 via the port monitor 160. However, if the print job includes a print-preview request, one of the filters in the filter pipeline 155 launches the preview application 180 and sends the XPS file to the preview application 180.

The port monitor 160 allows communication between the print system 120 and the printing device 170. For example, the port monitor 160 is configured to receive print data (e.g., the output from the filter pipeline 155) from the rendering service 140 and relay the print data to the printing device 170. The printing device 170 is configured to communicate with the port monitor 160 to receive and process the print data and generate images on one or more print media according to the print data.

The preview application 180 is configured to receive the XPS file from the filter pipeline 155 (e.g., one of the filters in the filter pipeline 155) when the print job includes a print-preview request. Then, the preview application 180 processes the print-preview request using the playable-filter-pipeline service 190 and displays a print preview of the print job via the computing device 100 (e.g., via the I/O interfaces of the computing device 100). The details of processing the print-preview request will be described hereinafter in reference to FIG. 1B.

Figure 1B:
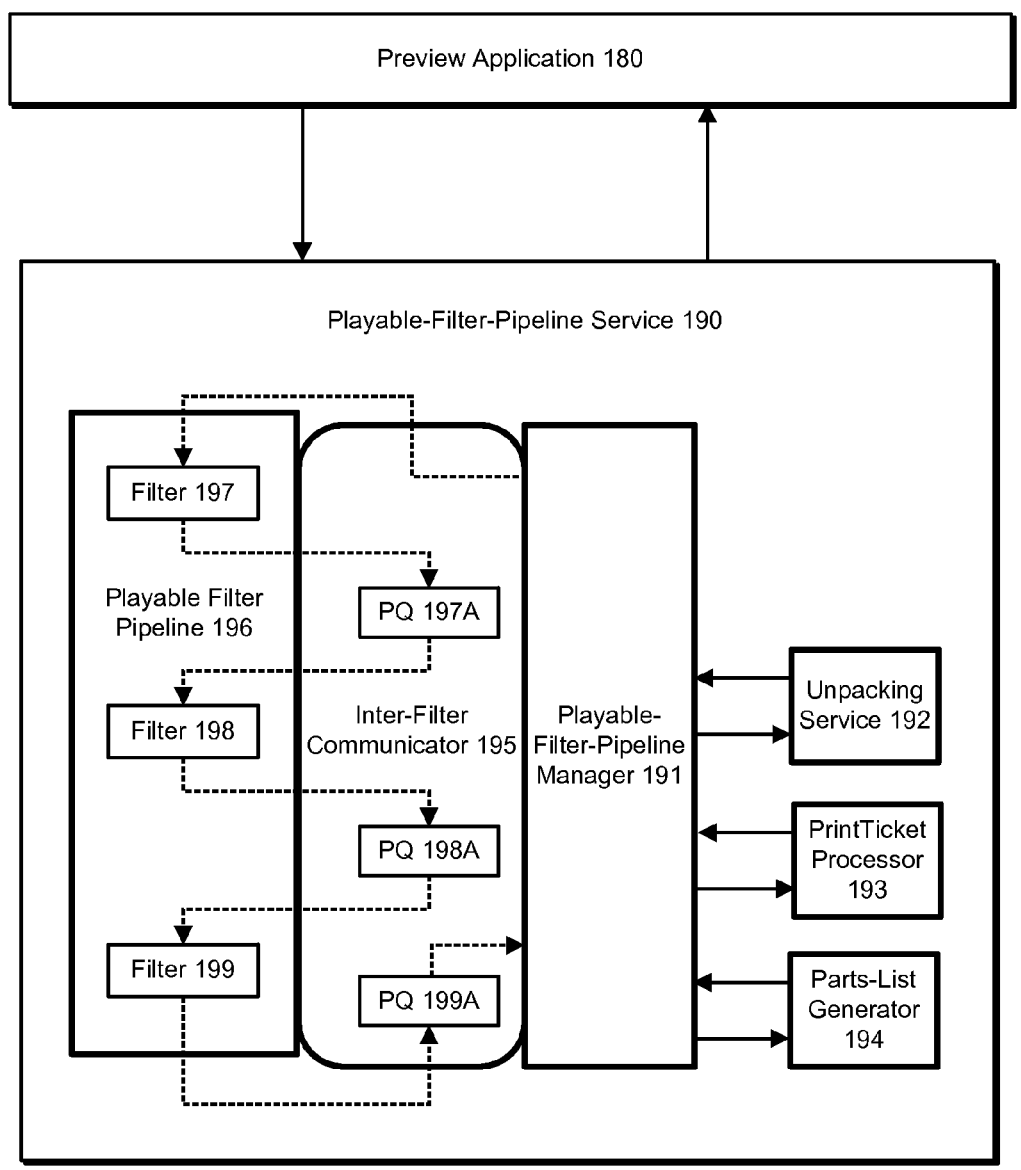
FIG. 1B is a block diagram that illustrates an example embodiment of a configuration of a print driver in the system for managing a print preview.

FIG. 1B is a block diagram that illustrates an example embodiment of a configuration of a print driver in the system for managing a print preview. The preview application 180 may be launched by the filter pipeline 155 when the print job includes a print-preview request. In addition, the preview application 180 is configured to generate a user interface that receives a request for a print preview of a print job from the user via a computing device (e.g., via the I/O interfaces of the computing device 100). The print-preview request may include a range of pages to be displayed in the print preview. Depending on the user interface, the range of pages for the print-preview request may be specified by the user inputting numerical values (e.g., page numbers) that indicate the range of pages, by the user manipulating a scroll bar shown in the user interface to change scroll view position, or by the user activating another control on the user interface. The preview application 180 is further configured to communicate with the playable-filter-pipeline service 190 to retrieve print-preview data of the print-preview request. For example, the preview application 180 sends the XPS file and the print-preview request to the playable-filter-pipeline manager 191 of the playable-filter-pipeline service 190. In addition, the preview application 180 is configured to generate a user interface that presents a print preview of a print job based on the print-preview data retrieved from the playable-filter-pipeline manager 191.

The playable-filter-pipeline service 190 is configured to receive the print-preview request and the XPS file from the preview application 180 and return the print-preview data to the preview application 180. The print-preview data may be in an image format, such as JPEG, PNG, and TIFF. In addition, the playable-filter-pipeline service 190 includes a playable-filter-pipeline manager 191, an unpacking service 192, a PrintTicket processing service 193, a parts-list generator 194, an inter-filter communicator 195, and a playable filter pipeline 196.

The playable-filter-pipeline manager 191 is configured to receive the print-preview request from the preview application 180 via the playable-filter pipeline service 190, communicate with one or more other components in the playable-filter-pipeline service 190 to produce print-preview data based on the print-preview request, and return the print-preview data to the preview application 180 via the playable-filter-pipeline service 190. For example, the playable-filter-pipeline manager 191 calls the unpacking service 192 to obtain the unpacked XPS file. Then, the playable-filter-pipeline manager 191 passes the unpacked XPS file to the PrintTicket processing service 193 to obtain a job flow of the XPS file. The playable-filter-pipeline manager 191 further communicates with the parts-list generator 194 to obtain a list of document parts (i.e., a parts list) that are specified in the print-preview request. The processes of obtaining a job flow and a parts list may be executed simultaneously. After the job flow and the parts list are obtained, the playable-filter-pipeline manager 191 starts the playable-filter-pipeline process and feeds the document parts that are listed in the parts list to the first filter (e.g., the filter 197) in the playable filter pipeline 196. The document parts include a plurality of document parts that each corresponds to a page in the range of pages that is specified in the print-preview request. When the last filter (e.g., the filter 199) in the playable filter pipeline 196 completes its operation and outputs print-preview data, the playable-filter-pipeline manager 191 sends the print-preview data to the preview application 180. The print-preview data may be created for each of the document parts and may be sent to the preview application 180 as the print-preview data for one document part are output from the last filter in the playable filter pipeline 196. For example, when the print-preview data of the first document part listed in the parts list are output from the last filter, the playable-filter-pipeline manager 191 sends the print-preview data of the first document part to the preview application 180 without waiting for the print-preview data of the next document part or the print-preview data of all of the document parts that are listed in the parts list to be output from the last filter. In some embodiments, the playable-filter-pipeline manager 191 caches the print-preview data. In addition, if the playable-filter-pipeline manager 191 receives a new print-preview request, the playable-filter-pipeline manager 191 compares the new print-preview request to the previous print-preview request.

The unpacking service 192 is configured to unpack an XPS file that was created by the rendering service 140. For example, the unpacking service 192 receives instructions from the playable-filter-pipeline manager 191 to unpack an XPS file of a print job by parsing the XPS file. After the unpacking of the XPS file is completed, the unpacking service 192 sends the unpacked XPS file to the playable-filter-pipeline manager 191.

The Printticket processing service 193 is configured to receive the unpacked XPS file from the playable-filter-pipeline manager 191, generate a job flow of the print job from the unpacked XPS file, and provide the job flow to the playable-filter-pipeline manager 191. The job flow describes the layout of the entire print job.

The parts-list generator 194 is configured to receive a print-preview request from the playable-filter-pipeline manager 191, generate a list of document parts that can be used to produce print-preview data according to the print-preview request, and provide the parts list to the playable-filter-pipeline manager 191. The document parts listed in the parts list correspond to the range of pages indicated in the print-preview request.

The inter-filter communicator 195 is configured to interface between the playable-filter-pipeline manager 191 and the playable filter pipeline 196, which includes a series of filters 197, 198, and 199. After each of the filters 197, 198, and 199 processes document parts, the processed document parts from the respective filters 197, 198, and 199 are written back to the inter-filter communicator 195 in the order the document parts are processed and output from the filters. For example, when the filter 197 completes processing the first document part of the document parts, the processed document part of the first document part is written back to the inter-filter communicator 195 while the second document part of the document parts is being processed by the filter 197. In addition, the inter-filter communicator 195 includes a plurality of part queues 197A, 198A, and 199A.

Each of the filters 197, 198, and 199 that is in the playable filter pipeline 196 is configured to perform a specific operation to the document parts. Each of the filters 197, 198, and 199 may be a layout filter for creating layouts of pages, a rendering filter for converting the data formats, a color-management filter for managing colors of images on the pages, or a watermark-adding filter for adding watermarks to the pages. For example, the order of the filters is arranged such that the filter that performs the least dependent operation is set as the first filter in the playable filter pipeline 196 and the filter that performs the next least dependent operation is set as the second filter in the playable filter pipeline 196.

Each of the part queues 197A, 198A, and 199A is configured to receive intermediate processing results (e.g., the processed document parts) from the filter that resides before the part queue, to retain the intermediate processing results, and to release the intermediate processing results to the next filter (e.g., the filter after the part queue) when the next filter in the pipeline requests the intermediate processing results. The part queues 197A, 198A, and 199A are configured to release the intermediate processing results to the next filter one processed document part at a time. In addition, the processed document parts are released to the next filter in the same order as the processed document parts were received at the part queue from the previous filter. For example, the first part queue (e.g., the part queue 197A) receives the first processed document part from the filter 197 and retains the first processed document part until the filter 198 requests the first processed document parts to be sent. When the first part queue receives the request from the filter 198, the first part queue releases the first processed document part to the filter 198. The part queues 198A and 199A work in a similar manner as the part queue 197A. However, the part queue 199A sends the processed document parts that were processed by the filter 199 to the playable-filter-pipeline manager 191. The playable filter pipeline 196 in the playable-filter-pipeline service 190 may have one or more filters.

Figure 2:
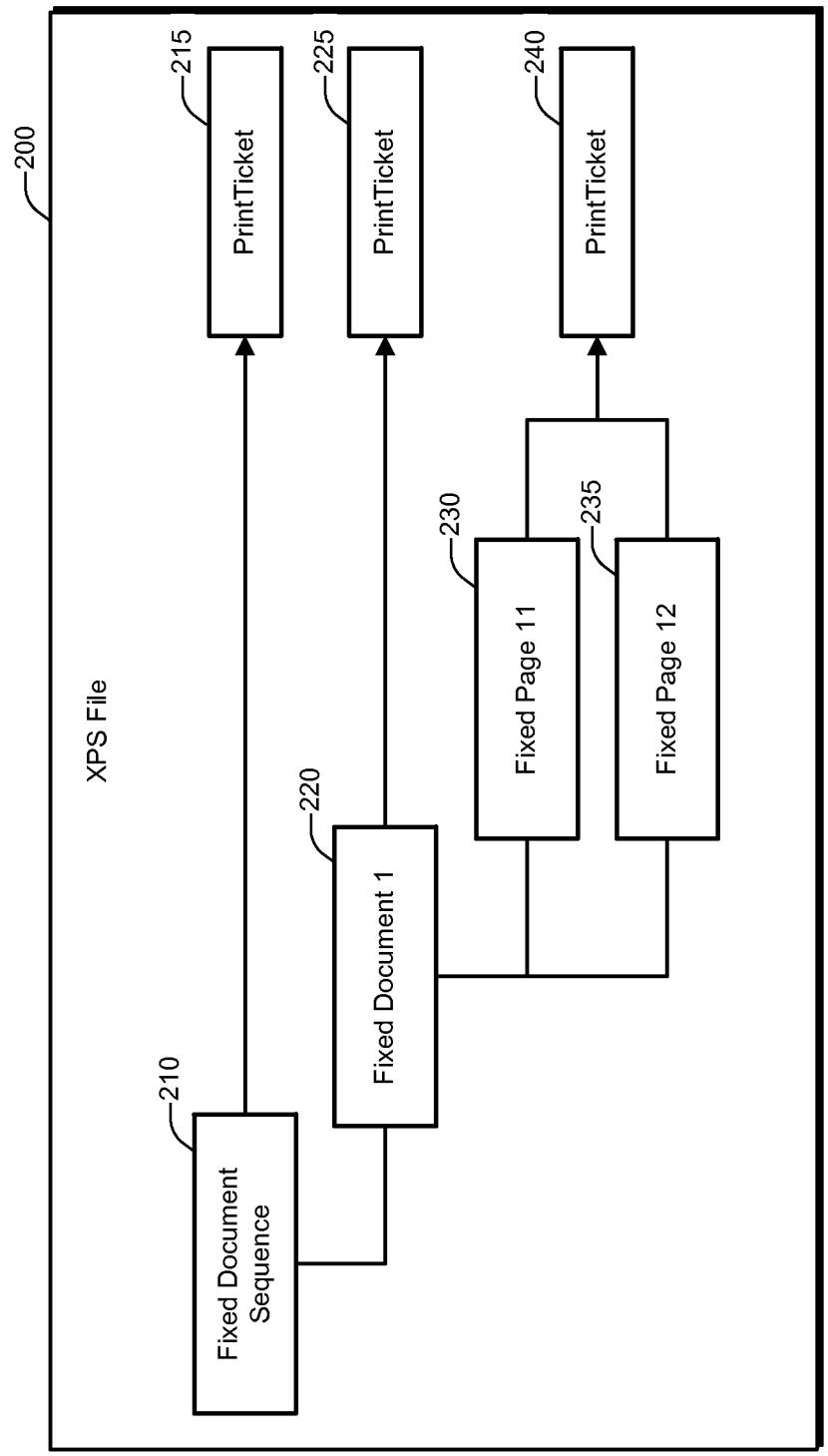
FIG. 2 is a block diagram that illustrates an example embodiment of an XPS file.

FIG. 2 is a block diagram that illustrates an example embodiment of an XML Paper Specification (XPS) file. An XPS file is created based on a print job from an application. An XPS file 200 includes a fixed document sequence 210. The fixed document sequence 210 contains a printticket (e.g., a PrintTicket) 215 and a fixed document 220 (e.g., Fixed Document 1). In some embodiments, the fixed document sequence 210 contains one or more fixed documents. Further, in some embodiments, the fixed document sequence 210 may not contain a printticket. The fixed document 220 contains a printticket 225, a first fixed page 230 (e.g., Fixed Page 11), and a second fixed page 235 (e.g., Fixed Page 12). In some embodiments, the fixed document 220 contains one fixed page or a plurality of fixed pages. In some embodiments, the fixed document 220 may not contain a printticket. The fixed pages 230 and 235 contain a printticket 240 and may contain resources, such as fonts and images. In some embodiments, each of the fixed pages 230 and 235 may have a printticket. Yet, in some embodiments, the fixed pages 230 and 235 do not contain a printticket. The printticket specifies the print setting options for a print job.

Figure 3:
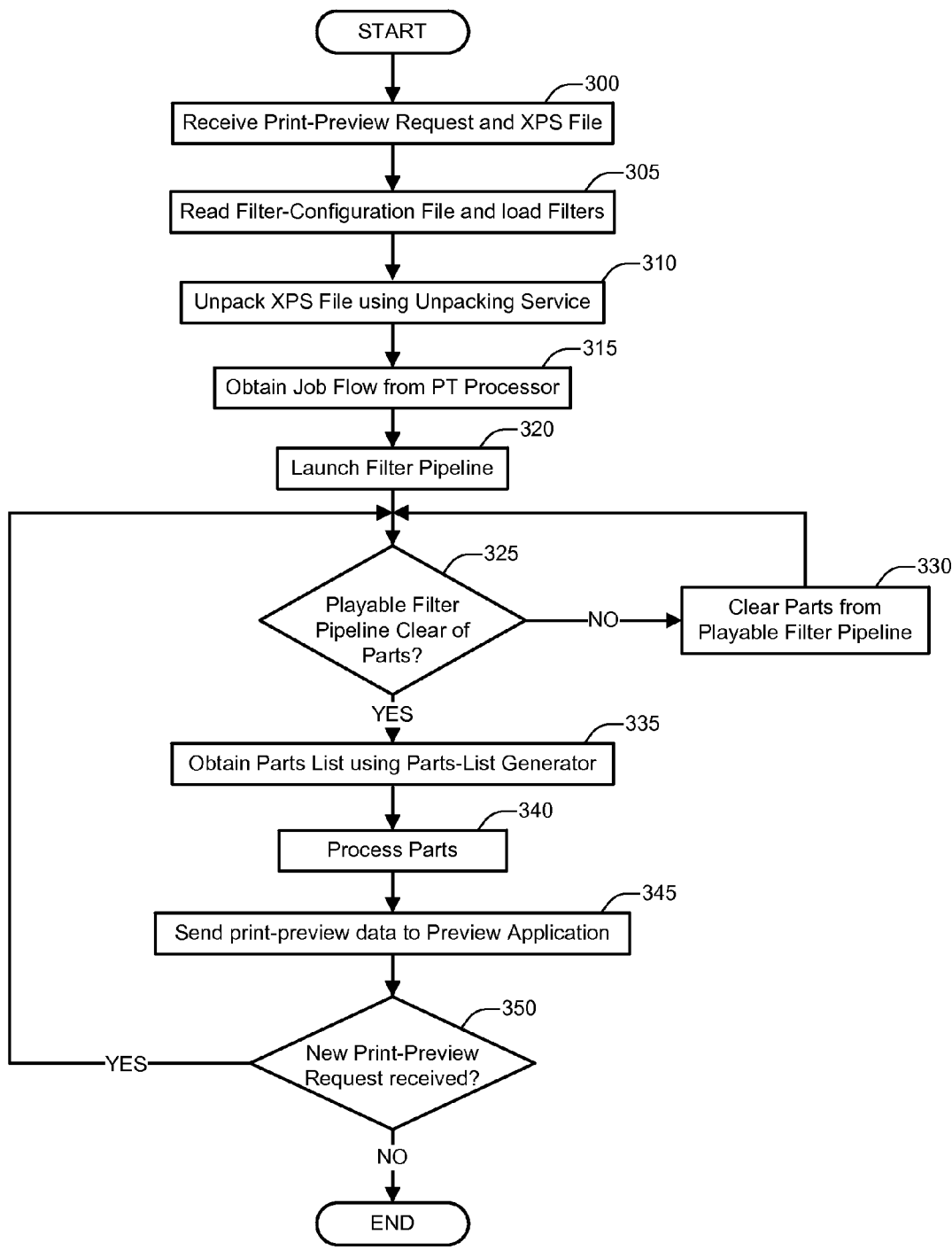
FIG. 3 is a flowchart that illustrates an example embodiment of a method for managing a print preview.

FIG. 3 is a flowchart that illustrates an example embodiment of a method for managing a print preview. The blocks of this method and the other methods described herein may be performed by one or more computing devices, for example the systems and devices described herein. Also, although this method and the other methods described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this method and the other methods described herein may omit blocks, add blocks, change the order of the blocks, combine blocks, or divide blocks into more blocks.

When a print job includes a print-preview request, a preview application is launched. For example, the print job for which a user requested a print preview is spooled to create an XPS file. Then, the XPS file is received into a print-filter-pipeline service (e.g., the print-filter-pipeline service 150) and is fed into the filter pipeline of the print-filter-pipeline service. Then, one of the filters in the filter pipeline of the print-filter-pipeline service launches the preview application. When the preview application is launched, the XPS file is sent to the preview application from the filter pipeline of the print-filter-pipeline service. Further, the preview application launches a playable-filter-pipeline service (e.g., the playable-filter-pipeline service 190) and sends the XPS file and the print-preview request to a playable-filter-pipeline manager (e.g., the playable-filter-pipeline manager 191) in the playable-filter-pipeline service.

Beginning in block 300, the playable-filter-pipeline manager receives the XPS file and the print-preview request from the preview application. In block 305, the playable-filter-pipeline manager reads a configuration file of the print job and loads filters that are listed in the configuration file into the playable filter pipeline. One or more filters may be loaded into the playable filter pipeline. The number of the filters may be determined by the number of filters necessary to produce the requested print preview of the print job.

In block 310, the playable-filter-pipeline manager unpacks the XPS file using an unpacking service in the playable-filter-pipeline service. The playable-filter-pipeline manager sends instructions to the unpacking service to unpack the XPS file of the print job that is associated to the print-preview request. Then, the unpacking service obtains and parses the XPS file. When the unpacking service completes the parsing of the XPS file, the unpacking service sends the unpacked XPS file to the playable-filter-pipeline manager.

In block 315, the playable-filter-pipeline manager obtains a job flow of the print job using a PrintTicket (PT) processor. When the playable-filter-pipeline manager receives the unpacked XPS file from the unpacking service, the playable-filter-pipeline manager sends the unpacked XPS file to the Printticket processing service. Then, the Printticket processing service generates a job flow of the print job based on the unpacked XPS file. When the generation of the job flow is completed, the playable-filter-pipeline manager obtains the job flow from the Printticket processing service. Then, in block 320, the playable-filter-pipeline manager launches a playable filter in the playable filter pipeline (e.g., the playable filter pipeline 196). For example, the playable filter pipeline is initialized when launched.

In block 325, the print-filter-pipeline manager determines whether the playable filter pipeline is clear of parts. The parts may at least include one or more document parts, one or more printtickets (e.g., PrintTickets), or both. If the playable filter pipeline is not clear of parts (block 325=NO), then the flow proceeds to block 330. For example, if the playable filter pipeline has not completed processing the parts from previous process, the print-filter-pipeline manager determines that the playable filter pipeline is not clear of parts. Otherwise, if the playable filter pipeline is clear of parts (block 325=YES), then the flow proceeds to block 335.

In block 330, the print-filter-pipeline manager clears the parts from the playable filter pipeline, and the flow returns to block 325. The print-filter-pipeline manager may send a state-reset command to the playable filter pipeline to clear the parts from the playable filter pipeline. The process of clearing parts from the playable filter pipeline will be described in more detail in reference to FIG. 5.

When the print-filter-pipeline manager determines that the playable filter pipeline is clear of parts in block 325, then in block 335, the print-filter-pipeline manager obtains a parts list according to the print-preview request using a parts-list generator (e.g., the parts-list generator 194). The process of obtaining the parts list will described in further detail in reference to FIG. 6.

In block 340, the print-filter-pipeline manager processes the document parts listed in the parts list using the playable filter pipeline. The process of the playable filter pipeline will be described in further detail in reference to FIG. 7.

Then, in block 345, the playable-filter-pipeline manager sends print-preview data output from the playable filter pipeline to the preview application, and a print preview of the print job is displayed to the user via a computing device (e.g., the I/O interfaces of the computing device 100). Finally, in block 350, the playable-filter-pipeline manager determines whether a new print-preview request has been requested. The playable-filter-pipeline manager may periodically check with the preview application to detect if a new print-preview request has been received by the preview application, and if a new print-preview request has been received, the playable-filter-pipeline manager obtains the new print-preview request from the preview application. In some embodiments, the preview application sends a new print-preview request to the playable-filter-pipeline manager every time the preview application receives a new print-preview request from the user. If a new print-preview request has been received by the playable-filter-pipeline manager (block 350=YES), then the flow returns to block 325. Otherwise, if a new print-preview request has not been received by the playable-filter-pipeline manager (block 350=NO), then the flow ends. Blocks 325-350 will be described in greater details in reference to FIG. 4.

Figure 4:
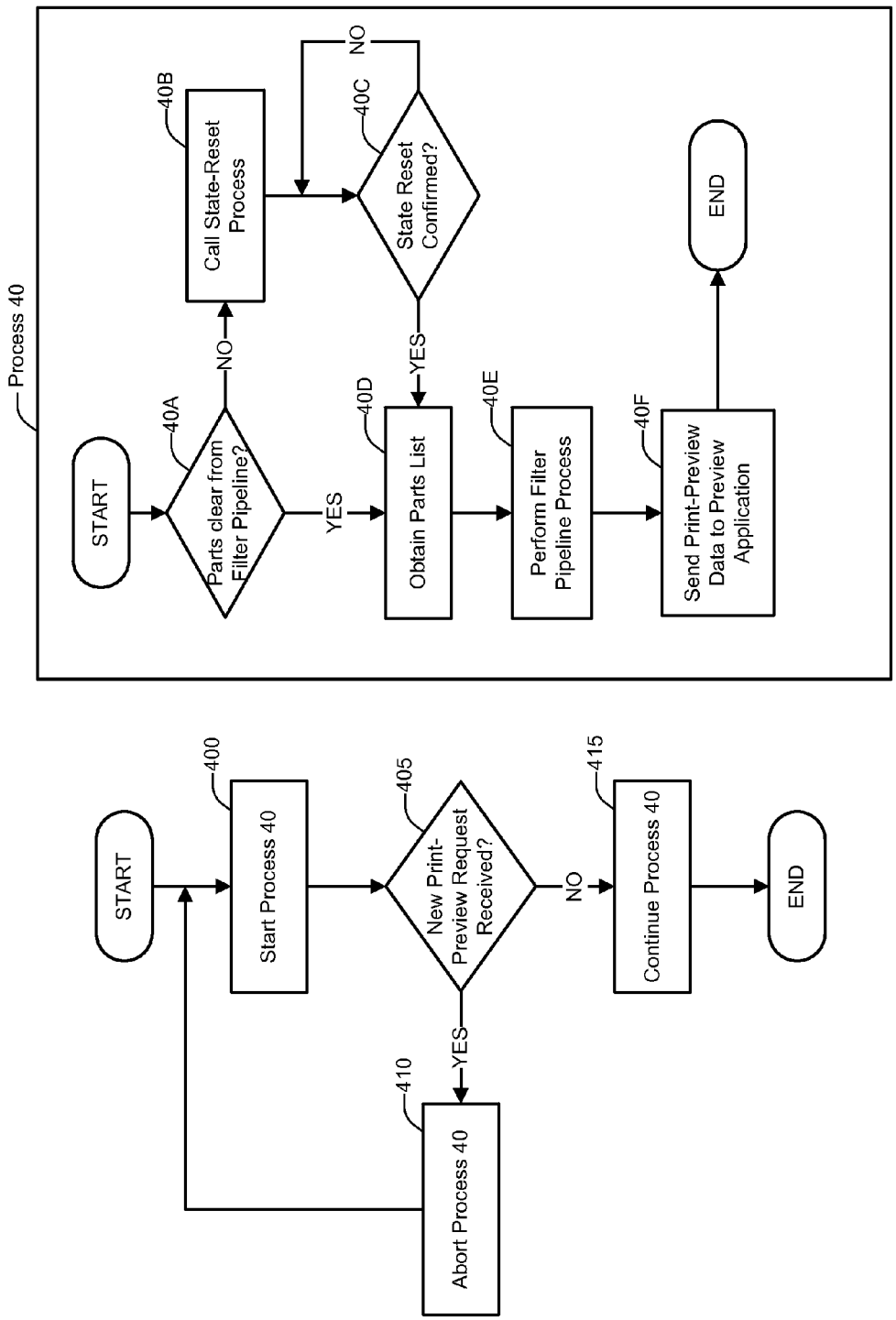
FIG. 4 is a flowchart that illustrates an example embodiment of a method for managing a print preview.

FIG. 4 is a flowchart that illustrates an example embodiment of a method for managing a print preview. When a playable-filter-pipeline manager launches the playable filter pipeline, a process 40 is started in block 400. The playable-filter-pipeline manager may perform the process 40. Then, in block 405, whether a new print-preview request has been received by the playable-filter-pipeline manager is determined. The playable-filter-pipeline manager may receive a new print-preview request while performing the process 40.

If a new print-preview request has been received (block 405=YES), then the flow proceeds to block 410, where the process 40 is aborted, and the flow returns to block 400 where the process 40 is started with the new print-preview request. The process 40 may be interrupted and aborted at any point while the process 40 is being performed. When the process 40 is aborted, the playable-filter-pipeline manager stops sending document parts to the filters in the playable filter pipeline. Further, the playable-filter-pipeline manager sends a "state reset" to the filters in the playable filter pipeline. Otherwise, if a new print-preview request has not been received (block 405=NO), then the flow proceeds to block 415 where the process 40 continues until it is completed.

The process 40 will be described hereinafter. The process 40 begins in block 40A, where the playable-filter-pipeline manager determines whether the playable filter pipeline is clear of parts (e.g., document parts, prittickets). In other words, the playable-filter-pipeline manager determines whether the playable filter pipeline has completed processing parts from any previous print-preview request. If the playable filter pipeline is clear of parts (block 40A=YES), then the flow proceeds to block 40D. For example, if the process for the previous print-preview request has been completed or if the playable filter pipeline has been initialized and does not have parts in any of the filters of the playable filter pipeline, then the playable-filter-pipeline manager determines that the playable filter pipeline is clear of parts. Otherwise, if the playable filter pipeline is not clear of parts (block 40A=NO), then the flow proceeds to block 40B. For example, if one or more filters are processing the parts from a previous print-preview request, then the playable-filter-pipeline manager determines that the playable filter pipeline is not clear of parts.

In block 40B, a state-reset process is called. When the state-reset process is called, the state of the playable filter pipeline is reset to the initial state where the playable filter pipeline is clear of parts. Then, in block 40C, the playable-filter-pipeline manager determines whether the state reset is confirmed. For example, whether the playable-filter-pipeline manager received a confirmation of the completion of the state reset is determined. If the state reset is confirmed (block 40C=YES), then the flow proceeds to block 40D. Otherwise, if the state reset is not confirmed (block 40C=NO), then block 40C is repeated until the state reset is confirmed. The detail of the state-reset process will be described in reference to FIG. 5.

In block 40D, the playable-filter-pipeline manager obtains a parts list of the print-preview request from a parts-list generator. The parts list indicates the document parts that will be used to produce print-preview data as requested by the user via the preview application. The details of obtaining a parts list of the print preview will be described in reference to FIG. 6.

In block 40E, the playable-filter-pipeline manager begins a filter pipeline process. The details of the filter pipeline process will be described in reference to FIG. 7.

Finally, in block 40F, the playable-filter-pipeline manager sends print-preview data to the preview application. When the filter pipeline process completes, the playable-filter-pipeline manager receives print-preview data (e.g., output from the filter pipeline). Then, the print-preview data is sent from the playable-filter-pipeline manager to the preview application, which presents the print preview of the print job according to the print-preview data via the computing device (e.g., the I/O interfaces of the computing device 100).

Figure 5:
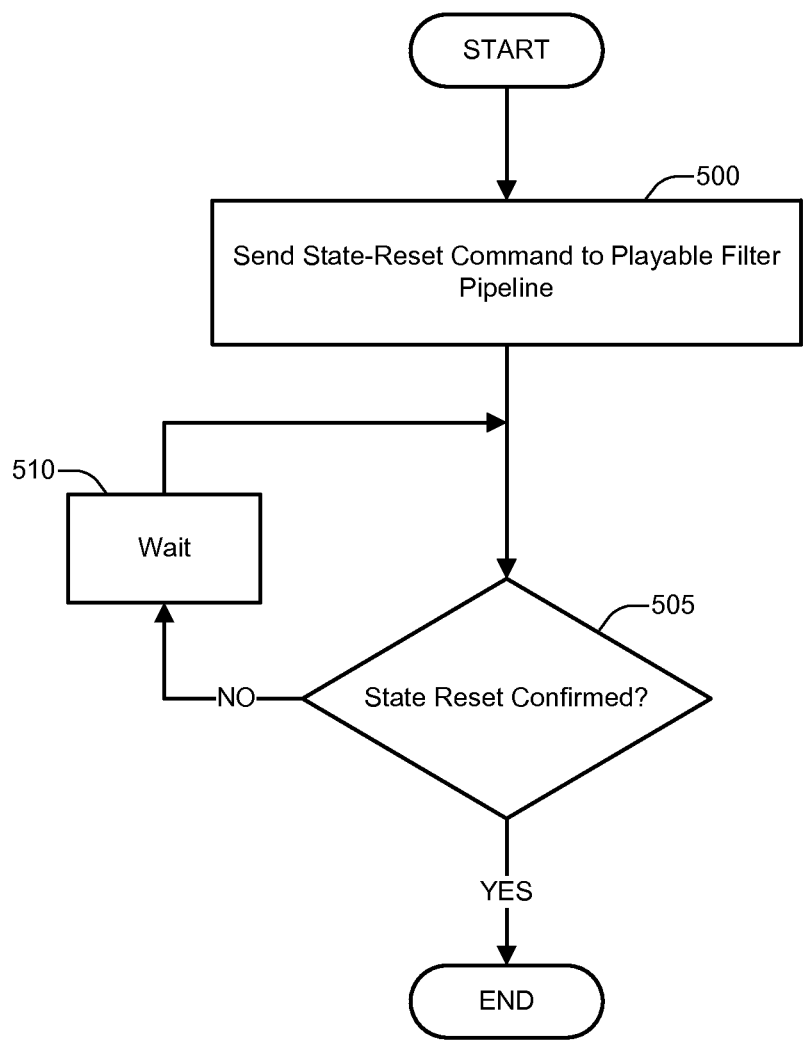
FIG. 5 is a flowchart that illustrates an example embodiment of a method for resetting a state in a playable filter pipeline.

FIG. 5 is a flowchart that illustrates an example embodiment of a method for resetting a state of a playable filter pipeline. When a playable-filter-pipeline manager determines that the playable filter pipeline is not clear of parts, then the playable-filter-pipeline manager calls a state-reset process. Beginning in block 500, the playable-filter-pipeline manager sends a state-reset command to the playable filter pipeline. For example, the playable-filter-pipeline manager sends the state-rest command to each of the filters in the playable filter pipeline to reset the state of the playable filter pipeline by calling a reset method of each of the filters. In some embodiments, the playable-filter-pipeline manager sends a clearance part to each of the filters in the playable filter pipeline where each of the filters resets the state of the filter and passes the clearance part to the next filter. This process is repeated until the playable-filter-pipeline manager receives the clearance part from the last filter in the playable filter pipeline. The playable-filter-pipeline manager may lock the part queues so that the filters do not receive any parts except for the clearance part from the part queues. In some embodiments, the playable-filter-pipeline manager stops feeding the parts to the first filter in the playable filter pipeline in order to reset the state of the playable filter pipeline.

Then, in block 505, whether the state reset has been confirmed by the playable-filter-pipeline manager is determined. The playable-filter-pipeline manager may receive a confirmation of the state rest from the playable filter pipeline when the playable filter pipeline completes the state rest process. In some embodiments, the playable-filter-pipeline manager periodically checks whether the playable filter pipeline has completed the state reset process. If the state reset is confirmed (block 505=YES), then the flow ends. Otherwise, if the state reset is not confirmed (block 505=NO), then the flow proceeds to block 510 where the playable-filter-pipeline manager waits for the confirmation. In some embodiments, the playable-filter-pipeline manager issues an error signal after the state reset is not confirmed in a predetermined period of time.

Figure 6:
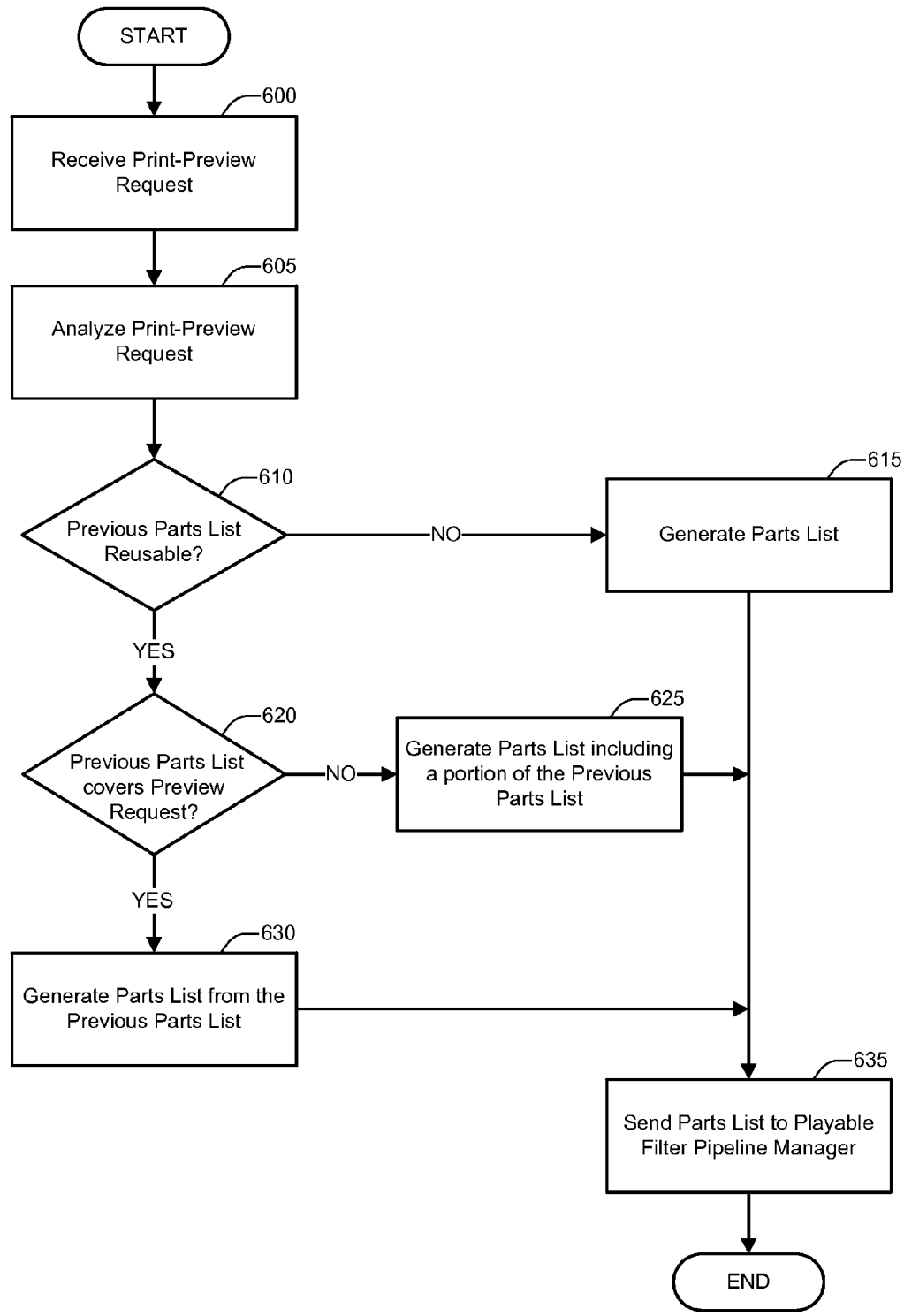
FIG. 6 is a flowchart that illustrates an example embodiment of operations that are performed by of a parts-list generator.

FIG. 6 is a flowchart that illustrates an example embodiment of operations that are performed by a parts-list generator. When a playable-filter-pipeline manager receives a print-preview request from a preview application, the playable-filter-pipeline manager passes the print-preview request to the parts-list generator. Beginning in block 600, the parts-list generator receives the print-preview request from the playable-filter-pipeline manager. Next, in block 605, the parts-list generator analyzes the print-preview request.

In block 610, the parts-list generator determines whether any portion of the previous parts list is reusable in the new print-preview request. For example, the parts-list generator compares the range of pages of the new print-preview request to the range of pages of the previous print-preview request. If no portion of the previous parts list is reusable (block 610=NO), then the flow proceeds to block 615. For example, if the previous parts list was for pages 4-29 and the range of pages for the new print-preview request is pages 35-48, then the parts-list generator determines that no portion of the previous parts list can be reused in generating a parts list for the new print-preview request. In some embodiments, if the previous parts list is not available, then the flow proceeds to block 615. Otherwise, if any portion of the previous parts list is reusable (block 610=YES), then the flow proceeds to block 620. For example, if the previous part list was for pages 4-29 and the range of pages of the new print-preview request is pages 21-37, then the parts-list generator determines that a portion of the previous parts list can be reused when generating a parts list for the new print preview.

In block 615, the parts-list generator generates a parts list according to the new print-preview request. The parts list includes a list of document parts that are used to satisfy the new print-preview request. For example, if the new print-preview request is for pages 4-9, then the document parts related to pages 4-9 are included in the parts list. Then, the flow proceeds to block 635.

In block 620, the parts-list generator determines whether the previous parts list covers the new print-preview request. The parts-list generator checks whether the range of pages of the previous parts list encompasses the range of pages of the new print-preview request. If the previous parts list covers the current print-preview request (block 620=YES), then the flow proceeds to block 630. For example, if the previous parts list is for pages 1-92 and the new print-preview request is for pages 5-75, then the parts-list generator determines that the new print-preview request is covered by the previous parts list. Otherwise, if the previous parts list does not cover the current print-preview request (block 620=NO), then the flow proceeds to block 625. For example, if the previous parts list is for pages 1-92 and the new print-preview request is for pages 73-117, then the parts-list generator determines that the new print-preview request is not covered by the previous parts list.

In block 625, the parts-list generator generates a parts list which includes a portion of the previous parts list. For example, if the previous parts list is for pages 53-80 and the new print-preview request is for pages 78-90, the parts-list generator reuses the document parts related to pages 78-80 from the previous part list and creates a list of parts related to pages 81-90 to generate the parts list for the new print-preview request (e.g., for pages 78-90). In another example, if the previous parts list is for pages 48-65 and the new print-preview request is for page 40-70, then the parts-list generator reuses the document parts listed in the previous parts list for pages 48-65, generates a list of document parts related to pages 40-47 and 66-70, and combines the parts list for pages 48-65 from the previous parts list and the parts list for pages 40-47 and 66-70 to generate a parts list for the new print-preview request.

In block 630, the parts-list generator generates a parts list from the previous parts list. For example, if the previous parts list is for pages 33-52 and the new print-preview request is for pages 41-51, the parts-list generator reuses the document parts related to pages 41-51 from the previous part list to generate the parts list for the new print-preview request (e.g., for pages 41-51). Finally, in block 635, the parts-list generator sends the parts list to the playable-filter-pipeline manager that requested the parts list.

Figure 7:
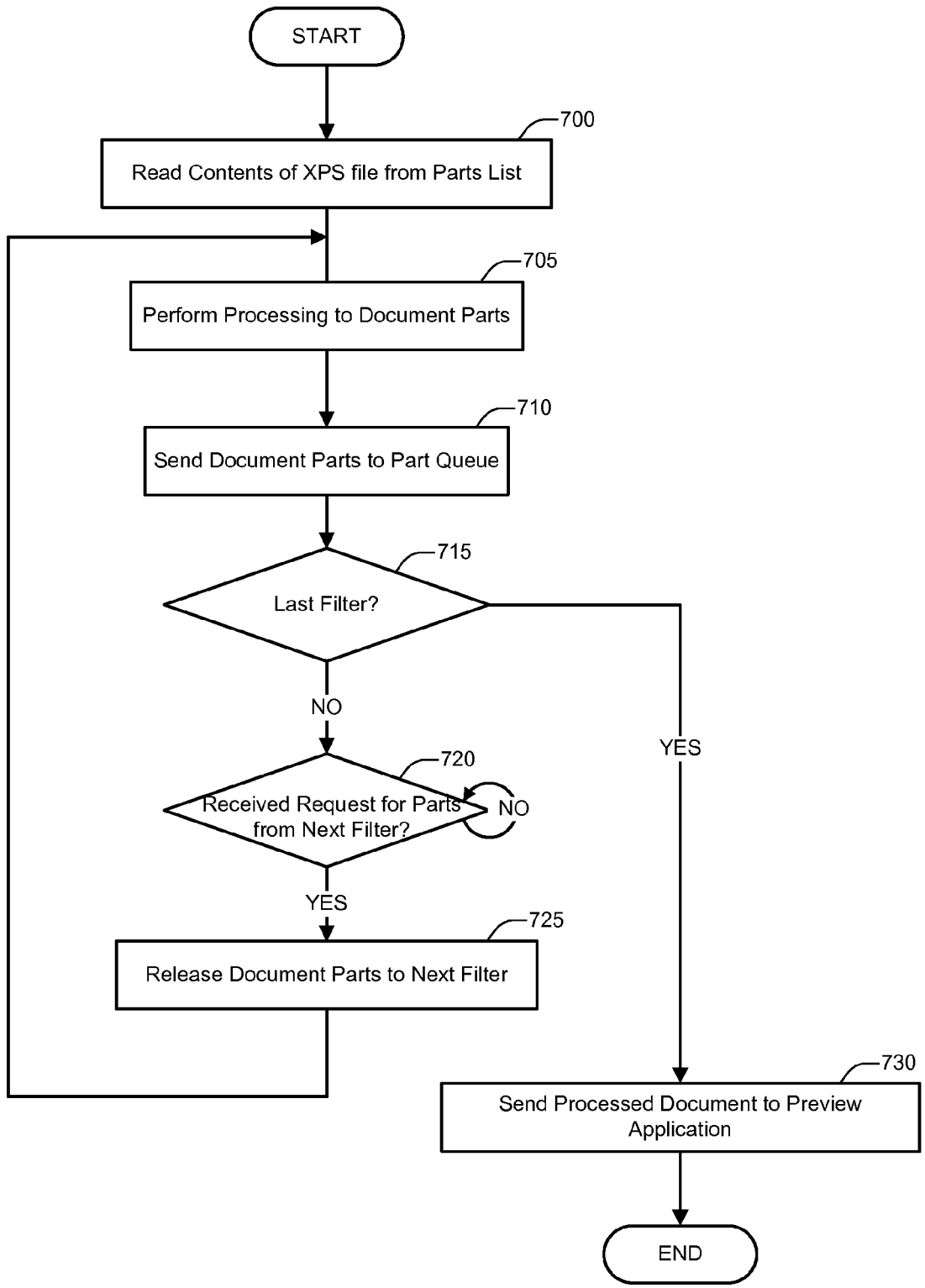
FIG. 7 is a flowchart that illustrates an example embodiment of operations that are performed by a playable filter pipeline.

FIG. 7 is a flowchart that illustrates an example embodiment of operations that are performed by a playable filter pipeline. When the playable-filter-pipeline manager obtains the unpacked XPS file, the job flow, and the parts list of the print-preview request, the playable-filter-pipeline manager starts the filter pipeline process. Beginning in block 700, the first filter (e.g., the filter 197 of FIG. 1B) in the playable filter pipeline reads the contents of the XPS file from the parts list. The contents of the XPS file include one or more of the document parts and one or more of the PrintTickets (e.g., printticket) associated with the document parts.

Then, in block 705, the filter (e.g., the first filter when this block is performed for the first time) performs processing to the document parts that are read from the parts list. The processing performed by the filters in the playable filter pipeline may be an operation assigned to the filter, such as N-up or watermark. In block 710, the first filter sends the processed document parts to a part queue in the inter-filter communicator (e.g., the inter-filter communicator 195). The document parts are processed and sent to a part queue one at a time. For example, the first filter processes the first document part of the parts list and sends the processed first document part to the first part queue. Then, the first filter proceeds to process and send the second document part to the first part queue.

Next, in block 715, whether the filter that processed and sent the document parts is the last filter in the filter pipeline is determined by the playable-filter-pipeline manager. If the filter is the last filter (block 715=YES), then the flow proceeds to block 730. Otherwise, if the filter is not the last filter (block 715=NO), then the flow proceeds to block 720.

Then, in block 720, whether a request for the document parts is received from the next filter (i.e., the second filter) in the playable filter pipeline is determined. If the request for the document parts is received (block 720=YES), then the flow proceeds to block 725. Otherwise, if the request for the document parts is not received (block 720=NO), then block 720 is repeated.

In block 725, the document parts are released from the part queue. The part queue is configured to release the document parts to the next filter one at a time. The document parts are released to the next filter in the order that the part queue received the document parts from the previous filter. For example, the document part that was received first by the part queue from the previous filter is released to the next filter first. Then, the document part that was received second by the part queue from the previous filter is released to the next filter second. Then, the flow returns to block 705 where the next filter performs blocks 705 and 710.

Finally, in block 730, the playable filter pipeline sends the processed document parts to the preview application via the playable-filter-pipeline manager. The document parts may be sent to the preview application one at a time as the last filter completes processing the document parts.

Figure 8:
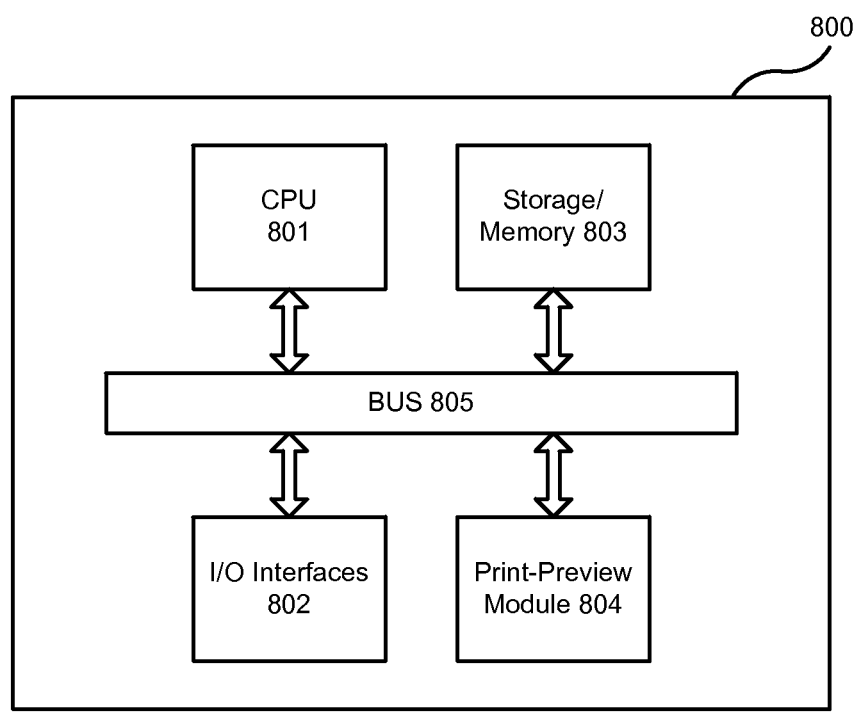
FIG. 8 is a flowchart that illustrates an example embodiment of a system for managing a print preview.

FIG. 8 illustrates an example embodiment of a system for managing a print preview. The system for managing a print preview includes a computing device 800 which includes a CPU 801, I/O interfaces 802, a storage/memory 803, a print-preview module 804, and a bus 805.

The storage/memory 803 includes one or more computer-readable or computer-writable storage media. A computer-readable storage medium, as opposed to mere transitory, propagating signals, is a tangible article of manufacture, for example, a magnetic disk (e.g., a hard drive, a floppy disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 803 stores computer-readable data or computer-executable instructions.

The print-preview module 804 contains instructions that, when executed, or circuits that, when activated, cause the computing device 800 to obtain print-preview data and generate a print preview based on the obtained print-preview data. The components of the computing device 800 communicate via the bus 805.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

While the above disclosure describes illustrative embodiments, it is to be understood that the invention is not limited to the above disclosure. To the contrary, the invention covers various modifications and equivalent arrangements within the spirit and scope of the appended claims.

What is claimed is:

1. A method for managing a print preview, the method comprising:
   receiving a first preview request, wherein the first preview request includes an XPS file;
   configuring a filter pipeline based on the XPS file;
   obtaining a job flow from the XPS file;
   generating a first parts list based at least on the first preview request and the job flow;
   determining whether the filter pipeline is clear of parts;
   in response to determining that the filter pipeline is not clear of the parts, resetting a state of each filter in the filter pipeline to clear the parts from the filter pipeline, wherein resetting the state of each filter in the filter pipeline includes resetting a state of a first filter in the filter pipeline and a state of a second filter in the filter pipeline by sending a clearance part to the first filter to reset the state of the first filter, wherein the first filter passes the clearance part to the second filter to reset the state of the second filter;
   in response to determining that the filter pipeline is clear of the parts, processing one or more parts listed in the first parts list using the filter pipeline;
   receiving a second preview request;
   determining whether the one or more parts listed in the first parts list of the first preview request can be used in the second preview request;
   generating a second parts list based on the second preview request, wherein the one or more parts listed in the first parts list are included in the second parts list if the one or more parts listed in the first parts list can be used in the second preview request;
   determining whether the filter pipeline is clear of the one or more parts listed in the first parts list; and
   in response to determining that the filter pipeline is clear of the one or more parts listed in the first parts list, processing one or more parts listed in the second parts list using the filter pipeline.

2. The method of claim 1, wherein the filter pipeline is configured based on a configuration file of the first preview request.

3. The method of claim 1, further comprising:
   sending the processed one or more parts listed in the first parts list and the processed one or more parts listed in the second parts list to a preview application.

4. The method of claim 1, wherein processing the one or more parts listed in the first parts list using the filter pipeline is performed by sending the one or more parts listed in the first parts list to the filter pipeline.

5. The method of claim 4, further comprising:
   in response to determining that the filter pipeline is not clear of the one or more parts listed in the first parts list, discontinuing the sending of the one or more parts listed in the first parts list to the filter pipeline.

6. The method of claim 4, further comprising:
   in response to determining that the filter pipeline is not clear of the one or more parts listed in the first parts list, resetting a state of the filter pipeline.

7. The method of claim 1, wherein the one or more parts listed in the first parts list are not included in the second parts list if the one or more parts listed in the first parts list cannot be used in the second preview request.

8. One or more non-transitory computer-readable media storing instructions that, when executed by one or more computing devices, cause the computer devices to perform operations comprising:
- receiving a first preview request, wherein the first preview request includes an XPS file;
- configuring a filter pipeline based on the XPS file;
- obtaining a job flow from the XPS file;
- generating a first parts list based at least on the first preview request and the job flow;
- determining whether the filter pipeline is clear of parts;
- in response to determining that the filter pipeline is not clear of the parts, resetting a state of each filter in the filter pipeline to clear the parts from the filter pipeline, wherein resetting the state of each filter in the filter pipeline includes resetting a state of a first filter in the filter pipeline and a state of a second filter in the filter pipeline by sending a clearance part to the first filter to reset the state of the first filter, wherein the first filter passes the clearance part to the second filter to reset the state of the second filter;
- in response to determining that the filter pipeline is clear of the parts, processing one or more parts listed in the first parts list using the filter pipeline;
- receiving a second preview request;
- determining whether the one or more parts listed in the first parts list of the first preview request can be used in the second preview request;
- generating a second parts list based on the second preview request, wherein the one or more parts listed in the first parts list are included in the second parts list if the one or more parts listed in the first parts list can be used in the second preview request;
- determining whether the filter pipeline is clear of the one or more parts listed in the first parts list; and
- in response to determining that the filter pipeline is clear of the one or more parts listed in the first parts list, processing one or more parts listed in the second parts list using the filter pipeline.

9. The one or more non-transitory computer-readable media of claim 8, the operations further comprising:
- sending the processed one or more parts listed in the first parts list and the processed one or more parts listed in the second parts list to a preview application.

10. The one or more non-transitory computer-readable media of claim 8, wherein processing the one or more parts listed in the first parts list using the filter pipeline is performed by sending the one or more parts listed in the first parts list to the filter pipeline.

11. The one or more non-transitory computer-readable media of claim 10, the operations further comprising:
- in response to determining that the filter pipeline is not clear of the one or more parts listed in the first parts list, discontinuing the sending of the one or more parts listed in the first parts list to the filter pipeline.

12. The one or more non-transitory computer-readable media of claim 10, the operations further comprising:
- in response to determining that the filter pipeline is not clear of the one or more parts listed in the first parts list, resetting a state of the filter pipeline.

13. The one or more non-transitory computer-readable media of claim 8, wherein the one or more parts listed in the first parts list are not included in the second parts list if the one or more parts listed in the first parts list cannot be used in the second preview request.

14. A computing device comprising:
- one or more processors; and
- one or more computer-readable media including instructions that, when executed by the one or more processors, cause the computing device to perform operations comprising:
  - receiving a first preview request, wherein the first preview request includes an XPS file;
  - configuring a filter pipeline based on the XPS file;
  - obtaining a job flow from the XPS file;
  - generating a first parts list based at least on the first preview request and the job flow;
  - determining whether the filter pipeline is clear of parts;
  - in response to determining that the filter pipeline is not clear of the parts, resetting a state of each filter in the filter pipeline to clear the parts from the filter pipeline, wherein resetting the state of each filter in the filter pipeline includes resetting a state of a first filter in the filter pipeline and a state of a second filter in the filter pipeline by sending a clearance part to the first filter to reset the state of the first filter, wherein the first filter passes the clearance part to the second filter to reset the state of the second filter;
  - in response to determining that the filter pipeline is clear of the parts, processing one or more parts listed in the first parts list using the filter pipeline;
  - receiving a second preview request;
  - determining whether the one or more parts listed in the first parts list of the first preview request can be used in the second preview request;
  - generating a second parts list based on the second preview request, wherein the one or more parts listed in the first parts list are included in the second parts list if the one or more parts listed in the first parts list can be used in the second preview request;
  - determining whether the filter pipeline is clear of the one or more parts listed in the first parts list; and
  - in response to determining that the filter pipeline is clear of the one or more parts listed in the first parts list, processing one or more parts listed in the second parts list using the filter pipeline.

15. The computing device of claim 14, wherein the filter pipeline is configured based on a configuration file of the first preview request.

16. The computing device of claim 14, the operations further comprising:
- sending the processed one or more parts listed in the first parts list and the processed one or more parts listed in the second parts list to a preview application.

17. The computing device of claim 14, wherein processing the one or more parts listed in the first parts list using the filter pipeline is performed by sending the one or more parts listed in the first parts list to the filter pipeline.

18. The computing device of claim 17, the operations further comprising:
- in response to determining that the filter pipeline is not clear of the one or more parts listed in the first parts list, discontinuing the sending of the one or more parts listed in the first parts list to the filter pipeline.

19. The computing device of claim 17, the operations further comprising:
- in response to determining that the filter pipeline is not clear of the one or more parts listed in the first parts list, resetting a state of the filter pipeline.

20. The computing device of claim 14, wherein the one or more parts listed in the first parts list are not included in the second parts list if the one or more parts listed in the first parts list cannot be used in the second preview request.

* * * * *